UNITED STATES PATENT OFFICE.

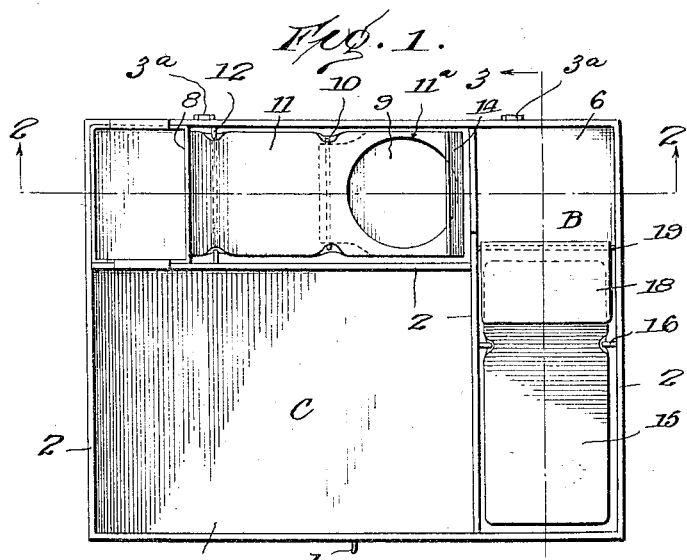

ROBERT E. BRISTER, OF POLLOCK, LOUISIANA.

ANIMAL-TRAP.

1,370,084.   Specification of Letters Patent.   Patented Mar. 1, 1921.

Application filed September 7, 1920. Serial No. 408,511.

*To all whom it may concern:*

Be it known that I, ROBERT E. BRISTER, a citizen of the United States, residing at Pollock, in the parish of Grant and State of Louisiana, have invented certain new and useful Improvements in Animal-Traps, of which the following is a specification.

This invention relates to animal traps in general and in particular to traps suitable for catching rodents.

The invention provides for a comparatively simple housing having therein apparatus adapted to be actuated by the weight of the animal caught to prevent withdrawal through the opening and to cause the animal to pass into the main receptacle or cell of the trap. The ultimate purpose of all successful traps is to cause animals to enter without distrust or alarm, such as might be derived from the excitement of the other animals already held in confinement. The present invention provides for these features by leading the animals into a passageway, which is separate and distinct from the main receptacle, and from which they pass into the main receptacle and operate a closure to prevent their return by means of their own weight.

Other advantages and details of construction are described and claimed in the following specification and claims, and illustrated in the accompanying drawing in which—

Figure 1 is a top plan view looking down into the trap, the top having been removed.

Fig. 2 is a view taken along the line of section 2—2 of Fig. 1, and showing the mounting of the main closure apparatus.

Fig. 3 is a sectional view taken along the line 3—3 of Fig. 1 and showing the mounting of the supplemental closure.

Referring in detail to the drawings, 1 indicates the floor or base of a rectangular trap embodying the details of the invention. 2 indicates the side walls and 3 is the cover or closure for the trap, which is hinged to the top of one of the side walls by suitable hinges 3ª and secured at the opposite side by convenient fastening means, as indicated at 3ᵇ. The trap is divided into three separate chambers, indicated by the letters A, B, and C. A indicates the initial passageway, which is entered from a vestibule 4 formed at one corner of the trap. The adjoining wall 5 forms one side of the vestibule; the roof of the vestibule is formed by the part 6, and the initial entry opening 7 is formed in the wall 4 of the vestibule. At one end of the chamber A is the bait box having the walls 8, which are perforated to display the bait to the interior of the chamber A. The top of the bait box is covered by the main cover 3. Immediately adjoining the entry 7 is an upwardly inclined plate member 9 forming a gangway over which the animal passes to enter the upper portion of the chamber A. The plate 9 is pivoted at its upper end, as indicated at 10, to the under side of a main plate member 11, which extends substantially horizontally dividing the chamber A into upper and lower portions. The plate 11 is pivoted on a horizontally extending rod 12, and a weight 13 is provided at one end to maintain the opposite end in the raised position. An upwardly projecting plate member 14 is located at the opposite end of the plate 11 and limits the upward movement of the plate. An animal entering the trap will pass over the plate 9, which rests slidably on the base member 1, pass through the opening 11ª immediately above the plate 9 formed in the plate 11 to reach the bait in the box 8. Immediately the weight of the animal depresses the plate 11, lowering the plate 11 to a resting position immediately on top of the plate 9 and closing the opening 11ª. This movement lowers the upwardly projecting plate 14 closing the opening 7, as indicated in dotted lines in Fig. 2, and opening the passageway extending into the chamber B immediately over the vestibule formed by the walls 4 and 5. As the weight of the animal is taken off of the plate 11, this member rises and the plate 14 closes the passageway and prevents the return of the animal from the chamber B to the chamber A. As the animal passes along the chamber B, the weight on the plate 15, which is pivoted at the point 16, is sufficient to counterbalance the balance weight 17 and lower the animal precipitately into the main cell or receptacle C. The tilting movement of the plate 15 raises the closure plate 18, which is hinged at 19 closing the retreat of the animal toward the chamber A. Normally the plate 18 is adapted to rest on one end of the plate 15, substantially parallel thereto.

Traps embodying the details of this invention have proved satisfactory and efficient and relatively inexpensive to manufacture. The materials of construction may be varied without departing from the scope of the invention, which includes all constructions in which a pivoted or movable member is provided with an opening through which the animal is adapted to pass, and which is closed by the weight of the animal. The structure is capable of use in any kind of trap, whether intended for large or small animals, rodents, or fowl.

What I claim is:

1. A trap comprising a housing having an entry opening and a removal opening, a closure for said removal opening, a main receptacle within said housing, a passageway extending from said entry opening to said main receptacle, a primary plate member located within said passageway and having an opening formed therein, said primary plate being pivoted to move in a vertical plane, a second plate member adapted to be engaged by said primary pivoted plate and thereby cover the opening in said primary plate.

2. A trap comprising a housing having an entry opening and a removal opening, a closure for said removal opening, a main receptacle within said housing, a passageway extending from said entry opening to said main receptacle, a primary plate member located within said passageway and having an opening formed therein, said primary plate being pivoted to move in a vertical plane, a second plate member constituting an inclined gangway secured beneath said primary plate and extending beneath said opening therein, said primary plate member being adapted to move downwardly under the weight of a trapped animal and to close the opening in said primary plate by resting the portion containing the opening against said second plate member.

3. A trap comprising a housing having an entry opening and a removal opening, a closure for said removal opening, a main receptacle within said housing, a passageway extending from said entry opening to said main receptacle, a primary plate member located within said passageway and having an opening formed therein, said primary plate being pivoted to move in a vertical plane, a second plate member constituting an inclined gangway hinged at its upper end to said primary plate member and extending beneath said opening therein, said primary plate member being adapted to move downwardly under the weight of a trapped animal and to close the opening in said primary plate by resting the portion containing the opening against said second plate member.

4. A trap comprising a housing having an entry opening and a removal opening, a closure for said removal opening, a main receptacle within said housing, a passageway extending from said entry opening to said main receptacle, a primary plate member located within said passageway having an opening formed therein and pivoted to swing in a vertical plane, a second plate member constituting an inclined gangway hinged at its upper end to said primary plate member and extending beneath said opening therein, said primary plate member being adapted to move downwardly under the weight of a trapped animal and to close the opening in said primary plate by resting the portion containing the opening against said second plate member, said primary plate member being so balanced as to normally maintain said opening therein in the upper or uncovered position and separated from said second plate except when depressed by the weight of a trapped animal on the upper surface of said primary plate.

5. A trap comprising a housing having an entry opening and a removal opening, a closure for said removal opening, a main receptacle within said housing, a passageway extending from said entry opening to said main receptacle, a primary plate member located within said passageway and having an opening formed therein, said primary plate being pivoted to move in a vertical plane, a second plate member constituting an inclined gangway secured beneath said primary plate and extending beneath said opening therein, said primary plate member being adapted to move downwardly under the weight of a trapped animal and to close the opening in said primary plate by resting the portion containing the opening against said second plate member, and an upwardly projecting plate member positioned adjacent the end of said primary plate opposite to the pivoted end thereof, and constituting a closure for normally closing said passageway between the upper side of said primary plate and said main receptacle, said upwardly projecting plate being adapted to open that portion of said passageway when said primary plate is lowered to permit the animal on said primary plate to pass into said receptacle.

6. A trap comprising a housing having an entry opening and a removal opening, a closure for said removal opening, a main receptacle within said housing, a passageway extending from said entry opening to said main receptacle, a primary plate member located within said passageway having an opening formed therein and pivoted to swing in a vertical plane, a second plate member constituting an inclined gangway hinged at its upper end to said primary plate member and extending beneath said opening therein, said primary plate member being adapted to move downwardly under the weight of a trapped animal and to close the opening in said primary plate by resting the portion containing the opening against said second plate member, said primary plate member being so balanced as to normally maintain said opening therein in the upper or uncovered position and separated from said second plate except when depressed by the weight of a trapped animal on the upper surface of said primary plate, and an upwardly projecting plate member positioned adjacent the end of said primary plate opposite to the pivoted end thereof, and constituting a closure for normally closing said passageway between the upper side of said primary plate and said main receptacle, said upwardly projecting plate being adapted to open that portion of said passageway when said primary plate is lowered to permit the animal on said primary plate to pass into said receptacle.

7. A trap comprising a housing having an entry opening and a removal opening, a closure for said removal opening, a main receptacle within said housing, a passageway extending from said entry opening to said main receptacle, a primary plate member located within said passageway and having an opening formed therein, said primary plate being pivoted to move in a vertical plane, a second plate member constituting an inclined gangway secured beneath said primary plate and extending beneath said opening therein, said primary plate member being adapted to move downwardly under the weight of a trapped animal and to close the opening in said primary plate by resting the portion containing the opening against said second plate member, an upwardly projecting plate member positioned adjacent the end of said primary plate opposite to the pivoted end thereof, and constituting a closure for normally closing said passageway between the upper side of said primary plate and said main receptacle, said upwardly projecting plate being adapted to open that portion of said passageway when said primary plate is lowered to permit the animal on said primary plate to pass into said receptacle, and a supplemental trapping device located in said passageway between said upwardly projecting plate member and said main receptacle and adapted to be actuated by the weight of an animal to close said passageway behind the animal.

In testimony whereof I affix my signature.

ROBERT E. BRISTER.